(12) United States Patent
Gardetto (10) Patent No.: US 8,281,835 B2
(45) Date of Patent: Oct. 9, 2012

(54) RUN-FLAT SUPPORT ASSEMBLY FOR A PNEUMATIC TIRED WHEEL AND METHOD FOR USE OF SAME

(75) Inventor: William W. Gardetto, Colleyville, TX (US)

(73) Assignee: Dynamic Runflats, Inc., Indian Land, SC (US)

( * ) Notice: Subject to any disclaimer, the term of this patent is extended or adjusted under 35 U.S.C. 154(b) by 602 days.

(21) Appl. No.: 12/410,319

(22) Filed: Mar. 24, 2009

(65) Prior Publication Data

US 2010/0071824 A1    Mar. 25, 2010

Related U.S. Application Data

(60) Provisional application No. 61/039,033, filed on Mar. 24, 2008.

(51) Int. Cl.
*B60C 17/04* (2006.01)
(52) U.S. Cl. ........ 152/520; 152/516; 152/517; 152/518; 152/519; 152/396
(58) Field of Classification Search ................... 152/155, 152/157, 158, 396, 400, 401, 516, 517, 518, 152/519, 520, 521, 522
See application file for complete search history.

(56) References Cited

U.S. PATENT DOCUMENTS

| | | |
|---|---|---|
| 1,170,225 A | 2/1916 | Dillmore |
| 2,165,810 A | 7/1939 | Paselk |
| 2,844,180 A | 7/1958 | Omeron |
| 2,989,108 A | 6/1961 | Gore |
| 3,025,898 A * | 3/1962 | Opel ............................ 152/158 |
| 3,028,900 A | 4/1962 | Scott |
| 3,828,836 A | 8/1974 | Bradley |
| 3,968,825 A | 7/1976 | Mitchell et al. |
| 4,059,138 A | 11/1977 | Mirtain et al. |
| 4,085,786 A | 4/1978 | Caravito |
| 4,157,107 A | 6/1979 | Cataldo |
| 4,169,496 A | 10/1979 | Cataldo |
| 4,183,388 A | 1/1980 | Cassidy |
| 4,202,393 A | 5/1980 | Ikeda et al. |
| 4,242,842 A | 1/1981 | Yancey |
| 4,257,467 A | 3/1981 | Van der Burg |
| 4,281,700 A | 8/1981 | Ross |
| 4,346,747 A | 8/1982 | Osada et al. |
| 4,428,411 A | 1/1984 | Markow et al. |

(Continued)

FOREIGN PATENT DOCUMENTS

DE    3818648    7/1989

(Continued)

*Primary Examiner* — Joseph Del Sole
*Assistant Examiner* — Timothy Kennedy
(74) *Attorney, Agent, or Firm* — Choate, Hall & Stewart LLP; William R. Haulbrook; Daniel S. Matthews (57) ABSTRACT

A run-flat support assembly for a wheel rim of a pneumatic tired wheel and method for use of the same are disclosed. In one embodiment, a tubular support structure is positioned in a tire cavity of the pneumatic tired wheel and coupled to the wheel rim to turn concurrently with an axis of rotation of the wheel rim. A skeletal structure is disposed within the tubular support structure. Circumferentially spaced linkages are displaceably secured to respective mounting races of a body of the skeletal structure. Each of the circumferentially spaced linkages is adapted to plastically fail at a pre-determined moment load in a run-flat condition, thereby pivoting relative to the respective mounting race.

15 Claims, 5 Drawing Sheets

U.S. PATENT DOCUMENTS

| | | |
|---|---|---|
| 4,572,260 A | 2/1986 | Ordu |
| 4,573,509 A | 3/1986 | Smith et al. |
| 4,673,014 A | 6/1987 | Markow |
| 4,709,738 A | 12/1987 | Goodell et al. |
| 4,794,966 A | 1/1989 | Markow |
| 4,823,854 A | 4/1989 | Payne et al. |
| 4,854,356 A | 8/1989 | Koutsoupidis |
| 5,000,241 A | 3/1991 | Patecell |
| 5,012,849 A | 5/1991 | Ko |
| 5,215,137 A | 6/1993 | Weeks et al. |
| 5,660,653 A | 8/1997 | Gardetto |
| 6,109,319 A | 8/2000 | Gardetto |
| 6,516,846 B2 * | 2/2003 | Chiu ............... 152/158 |
| 2005/0217781 A1 * | 10/2005 | Gardetto ............. 152/520 |
| 2005/0236082 A1 * | 10/2005 | Clouet ............. 152/400 |
| 2010/0141018 A1 * | 6/2010 | McCue ............ 301/5.1 |

FOREIGN PATENT DOCUMENTS

| | | |
|---|---|---|
| EP | 0490585 | 12/1991 |
| EP | 0569710 | 4/1993 |

\* cited by examiner

*Fig.8B*

RUN-FLAT SUPPORT ASSEMBLY FOR A PNEUMATIC TIRED WHEEL AND METHOD FOR USE OF SAME

PRIORITY STATEMENT & CROSS-REFERENCE TO RELATED APPLICATIONS

This application claims priority from the following commonly owned, co-pending patent application: "Run-Flat Support System for a Pneumatic Tired Wheel and Method of Installing Same" filed in the name of William W. Gardetto on Mar. 24, 2008 and assigned Application Ser. No. 61/039,033; which is hereby incorporated by reference for all purposes.

TECHNICAL FIELD OF THE INVENTION

This invention relates, in general, to pneumatic tires for on and off road vehicles and, in particular, to a run-flat support assembly having active, dynamic load responsive components for a pneumatic tired wheel and a method for use of the same that supports a tire in a deflated or run-flat condition.

BACKGROUND OF THE INVENTION

Pneumatic tired wheels are widely used in virtually all types of land vehicles, including automobiles, trucks, trailers, tractors, and other self propelled and unpowered vehicles, and aircraft landing gear. The intense development activities involving pneumatic tired wheels and tires has resulted in a highly developed state of the art with respect to tire design, composition, function and reliability.

The performance of pneumatic or gas charged tires is substantially degraded by the loss of inflation pressure. Various attempts have been made to eliminate loss of charge pressure due to tire wall puncture and provide tire designs that will enable the tire to continue to operate in a deflated or "run-flat" condition ranging from modification of tire design to introduction of materials and devices within the tire cavity to support the tire during a deflation period.

Typical run-flat technology utilizes a passive approach where a solid mass supports a load in a run-flat condition. During such a condition, the rotating tire material, e.g., urethane, does not respond normally and a hysteresis develops which causes heat stress conditions. At particular frequencies, the rotating tire material reacts slowly to the applied forces and "lags" or does not completely return or rebound to its original state. The applied forces at particular frequencies above a threshold deform the rotating tire material and internal elastic and frictional stresses are produced, which result in energy lost to heat and the aforementioned heat stress conditions. Accordingly, there is a need for run-flat technology which minimizes heat hysteresis and heat stress conditions.

SUMMARY OF THE INVENTION

A run-flat support assembly and method for use of the same are disclosed. The run-flat support assembly may be installed on a pneumatic tired wheel within the tire pressure cavity to support the tire when it is partially or completely deflated without substantially reducing the wheel effective diameter so that the vehicle stability and control is not compromised and the vehicle operated with the tire deflated.

Properties of materials are structure sensitive and the basis of materials design, therefore, is to control components and substructures so as to achieve the desired mechanical and thermal properties. Rather that implementing a passive approach like the existing technology, principles of biomimetics and biomimicry are utilized to produce a run-flat system for a pneumatic tired wheel that meets the demand for run-flat technology which minimizes the heat hysteresis and heat stress, among other negative conditions.

In one embodiment, the run-flat support assembly for a wheel rim of a pneumatic tired wheel includes a tubular support structure that is positioned in a tire cavity of the pneumatic tired wheel and coupled to the wheel rim to turn concurrently with an axis of rotation of the wheel rim. A skeletal structure is disposed within the tubular support structure. Circumferentially spaced linkages are displaceably secured to respective mounting races of a body of the skeletal structure by retainer members. Each of the circumferentially spaced linkages is adapted to plastically fail at a pre-determined moment load in a run-flat condition, thereby pivoting relative to the respective mounting race. In another embodiment, RFID tags are associated with the respective plurality of retainer members. Each of the RFID tags alters frequency in response to the respective retainer member plastically failing. An RFID detector aggregates data relative to the plurality of RFID tags to measure moment load.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
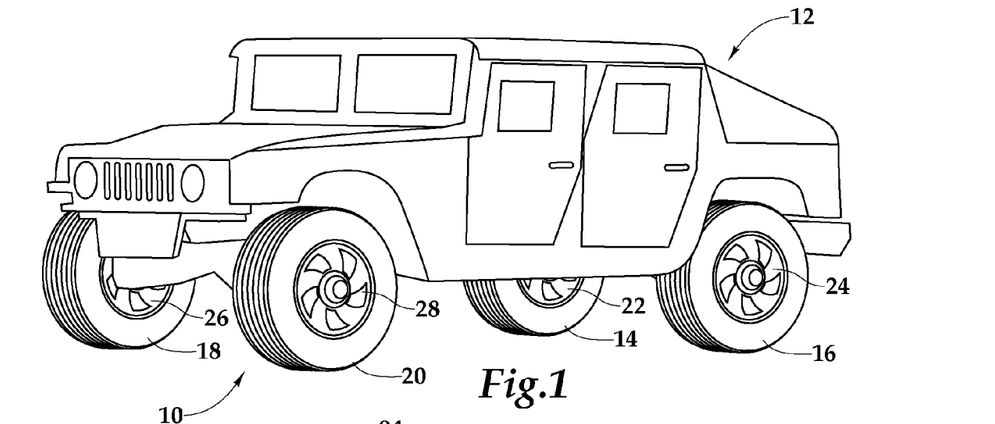
FIG. 1 is a front perspective view of one embodiment of multiple instances of a run-flat support assembly being utilized on a vehicle.

Referring initially to FIG. 1, therein is depicted a run-flat support assembly that is schematically illustrated and generally designated 10. The run-flat support assembly 10 is being employed by a vehicle 12, which may be a light, highly mobile, diesel-powered, four-wheel-drive vehicle equipped with an automatic transmission and configurable for various tasks. Power is transferred to drive axles and onto rear pneumatic tired wheels 14 and 16 and pneumatic tired wheels 18 and 20 which are mounted with split wheel rims 22, 24, 26, and 28, respectively. In one embodiment, the tires for the pneumatic tired wheels 14, 16, 18, and 20 may be 37×12.50R 16.5LT or larger radial tires and the split wheel rims 22, 24, 26, and 28 are each of a two wheel half-section design having a diameter of approximately 16.5 inches or greater. Each tire associated with one of the pneumatic tired wheels 14, 16, 18, and 20 includes a run-flat support assembly 10 to enable operation in a flat condition, e.g., when a tire is an under-inflated or deflated condition.

It should be appreciated that although the run-flat support assembly 10 is illustrated as being utilized by a vehicle 12 resembling a High Mobility Multipurpose Wheeled Vehicle (HMMWV), which is also known as a "Humvee", in FIG. 1, the run-flat support assembly 10 described herein may be utilized in a variety of vehicles and, in particular, much heavier and larger vehicles. The run-flat support assembly 10 described herein may be utilized with virtually all types of land vehicles, including automobiles, trucks, trailers, tractors, and other self propelled and unpowered vehicles, and aircraft landing gear. Moreover, it should be appreciated that tires of all sizes including both radial ply and bias ply tires as well as wheel rims of all sizes are within the teachings of the present invention.

Figure 2:
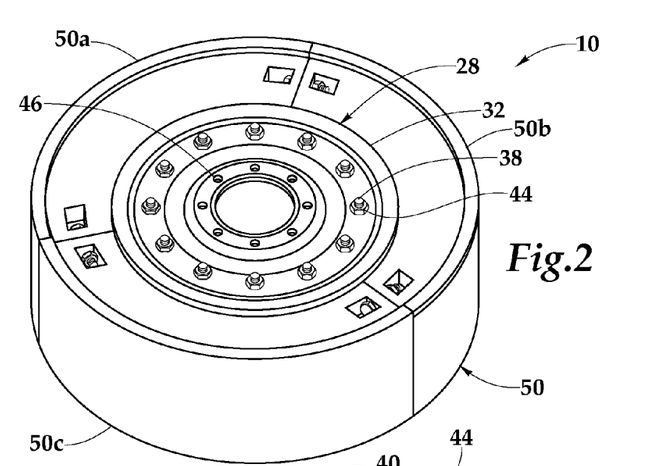
FIG. 2 is a perspective view of the run-flat support assembly of FIG. 1 installed in a split wheel rim of a pneumatic tired wheel, wherein the tire has been omitted for purposes of illustration and explanation.
Figure 3:
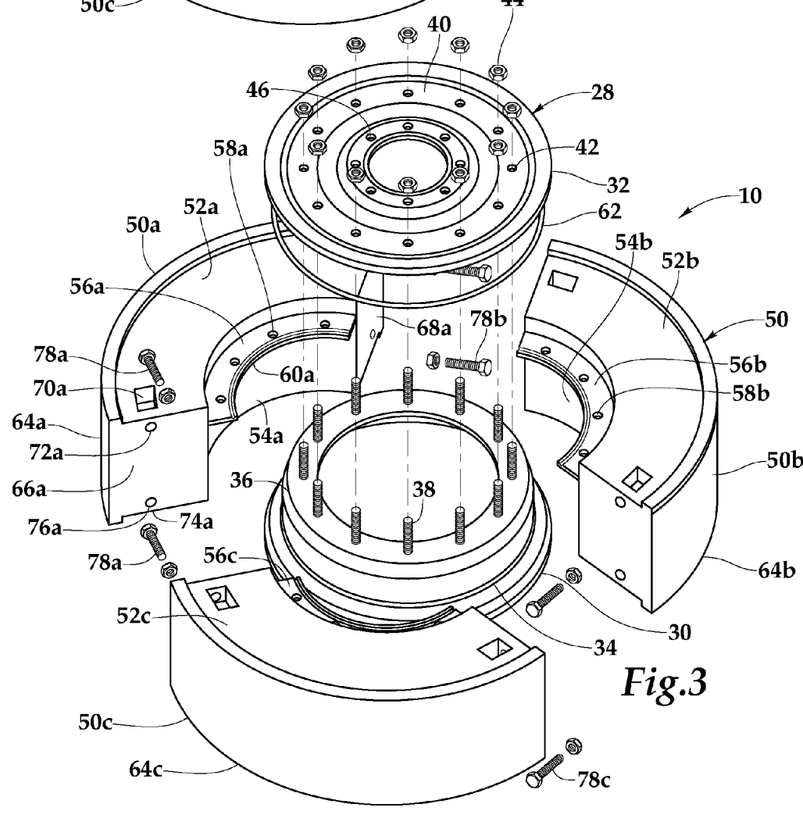
FIG. 3 is perspective exploded view of the run-flat support assembly of FIG. 2.

With reference to FIGS. 2 and 3, as discussed, in one implementation, the run-flat support assembly 10 may be utilized with a split wheel rim, such as the split wheel rim 22 having rims 30, 32. The rim 30 includes a body 34 and a drop-center surface 36. Mounting studs 38, which may be threaded, extend from the body 34. Similarly, the rim 32 includes a body 40 having mounting holes 42 therethrough for mating with mounting studs 38. In one implementation, a one-to-one correspondence exists between the mounting holes 42 and the mounting studs 38 such that equal numbers of mounting holes 42 and mounting studs 38 are present. Moreover, the mounting studs 38 are spaced to mate with the mounting holes 42. Nuts 44 are releasably securable to the mounting studs 38. Mounting holes 46 provide for the attachment of the run-flat support assembly 10 to an axle of the vehicle 12. With respect to mounting alignment, the run-flat support assembly 10 is mounted directly to the wheel of the vehicle 12 to create a line of force transference to the wheel that furnishes a path of positive load transfer.

Support segments 50, which are individually numbered 50a, 50b, and 50c, are adapted for attachment to the split wheel rim 22 in order to provide support for the pneumatic tired wheel during a run-flat or flat condition. With respect to the support segment 50a, a body 52a of sufficient hardness is included to maintain shape under load. An inner radial surface 54a conforms to the shape of the rim 30 and a torque flange 56a extends therefrom. Coupling holes 58a are spaced circumferentially about the torque flange 56a to align with a portion of the mounting studs 38 and be mounted thereto such that the torque flange 56a interposingly secures the support 50a between the rims 30, 32. In one implementation, 12 evenly spaced coupling holes are used to provide 6 coupling holes per π radians of torque flange or 4 coupling holes per support segment 50a, 50b, 50c. The torque flange 56a is grooved with groove 60a to seat an "O" ring seal 62 that provides a substantially airtight pneumatic cavity. Further, the torque flange 56a may have a shape that complements rim 30 to ensure a formed fit. Moreover, in another embodiment, a single piece torque ring, onto which the support segments are attached, is utilized instead of the multiple piece torque flange.

A crown member 64a of the body 52a is opposite the inner radial surface 54a. In operation, the crown member 64a engages an inner wall of the of the pneumatic tired wheel 20 during a flat condition to support the split wheel rim 22 and associated load to provide continued mobility. Radial end members 66a, 68a provide for an end-to-end mating engagement of the support segment 50a with the support segments 50b and 50c. More specifically, the radial end member 66a includes a recess 70a and a passageway 72a as well as a recess 74a and a passageway 76a. Similarly, the radial end member 68a includes complimentary recesses and passageways. In operation, when radial end members of different support segments abut, the passageways align and the recesses provide for the insertion of a fastener 78a such as a bolt, lug nut, and washer. It should be appreciated that the use of recesses and passageways is not required by the present invention. For example, in another embodiment, radial end members of adjacent support segments may include complementary male and female portions that are operable to be disposed in mating engagement when positioned for coupling to the torque assembly. The components described herein, such as the bodies 52a, 52b, and 52c of support segments 50a, 50b, and 50c may be manufactured from a resin, elastomer or other material that meets the requisite load and strength requirements. It should be understood that corresponding parts of the support segments 50a, 50b, and 50c have the same number with an identifying letter, i.e., a, b, or c. Moreover, it should be appreciated that in particular embodiments, the support segments are not symmetrical as suggested by this numbering convention.

As alluded, torque flanges 56a, 56b, 56 radially align to form torque flange 56, which sits upon drop-center surface 36 such that the coupling holes 58a, 58b, 52c of the torque flanges 56a, 56b, 56c align with the mounting studs 38. Once the "O" ring seal 62 is positioned on the groove 60, then the rim 32 is set and secured by the nuts 44. Using the passageways and recesses, such as passageways 72a, 76a and recesses 70a, 74a, the fasteners 78a, 78b, 78c secure the support segments 50a, 50b, 50c to one another. It should be appreciated that in another embodiment, the support segments 50 are formed directly onto the split wheel rim 22 without the need for the torque flange 56.

Figure 4:
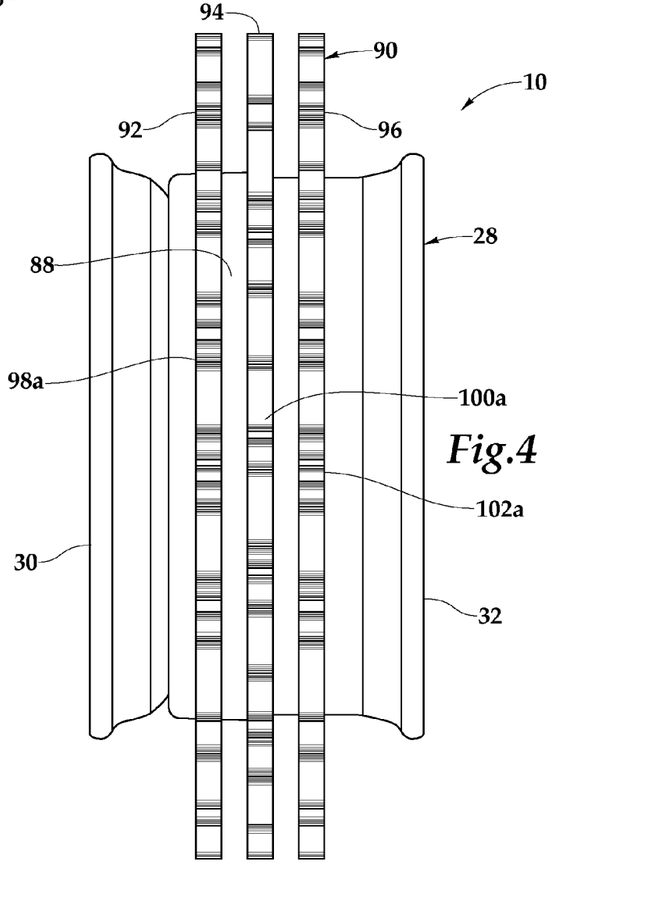
FIG. 4 is a front elevation view of the run-flat support assembly of FIG. 2 wherein portions of support segments of the run-flat support assembly have been omitted for purposes of illustration and explanation.
Figure 5:
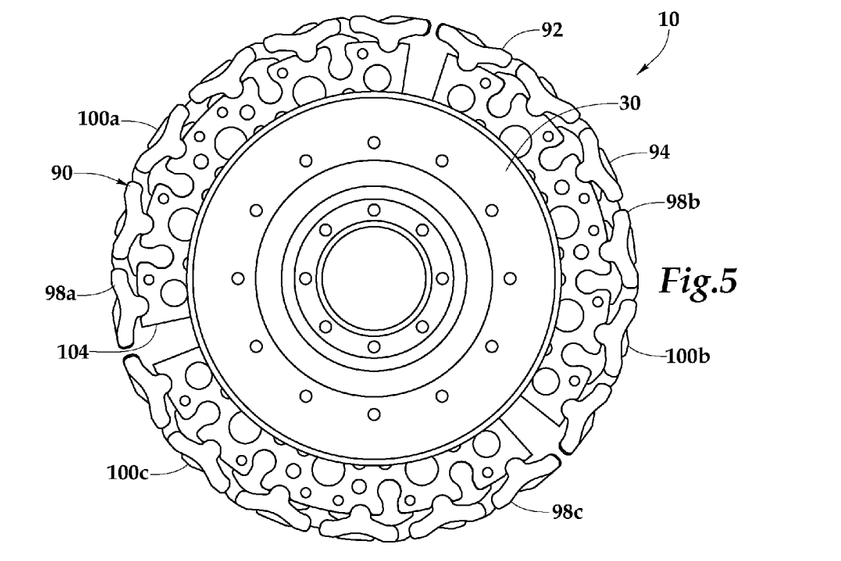
FIG. 5 is a side elevation view of an interior view of the run-flat support assembly shown in FIG. 4.
Figure 6:
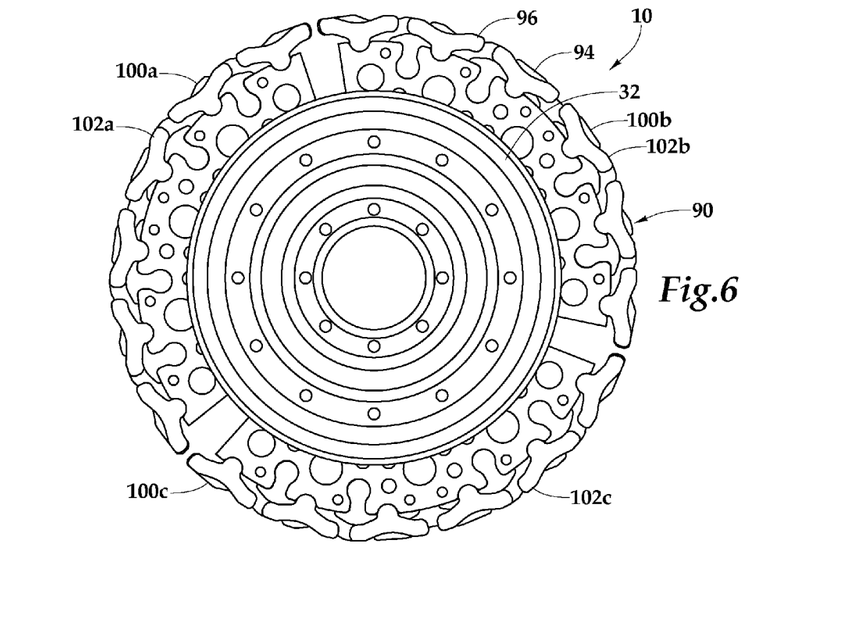
FIG. 6 is a side elevation view of an exterior view of the run-flat support assembly shown in FIG. 4.

With reference to FIGS. 4 through 6, the run-flat support assembly 10 is depicted with the bodies 52, i.e., bodies 52a-c collectively, of the support segments 50 removed for purposes of explanation to illustrate a skeletal structure 90 comprising skeletal rings 92, 94, 96. In the illustrated embodiment, each skeletal ring 92, 94, 96 includes three skeletal members corresponding to each of the support segments 50. By way of example, skeletal ring 92 includes skeletal members 98a, 98b, 98c; skeletal ring 94 includes skeletal members 100a, 100b, 100c; and skeletal ring 96 includes skeletal members 102a, 102b, 102c. Skeletal members 98a, 100a, 102a form a portion of the support segment 50a and are encased by the body 52a. Similarly, skeletal members 98b, 100b, 102b form a portion of the support segment 50*b* and skeletal members 98*c*, 100*c*, 102*c* form a portion of the support segment 50*c*. As shown in FIG. 4, as well as FIGS. 8A and 8B, in support segment 50*a*, a base 88 joins the skeletal members 98*a*, 100*a*, 102*a*, and the torque flange 56*a* extends therefrom. A similar arrangement with a base and torque flange is found in the support segments 50*b*, 50*c* as well. In one embodiment, the skeletal members, the bases, and the torque flanges may comprise a metal alloy, aluminum, or suitable material.

Each skeletal member includes a body having plurality of apertures therethrough. By way of example, with reference to skeletal member 98*a*, a body 104 is positioned to turn concurrently with the axis of rotation of the pneumatic tired wheel 20. The run-flat support assembly 10 is scalable and may be configured for any application. As will be discussed in further detail hereinbelow, although three skeletal rings and nine skeletal members are depicted, the run-flat support assembly 10 is scalable and may comprise any number of skeletal rings and skeletal members. Moreover, multiple skeletal members may be laterally spaced with the resin of the bodies 52 interposed therebetween to provide a lateral heat barrier and/or to accommodate different widths of tires.

Figure 7A:
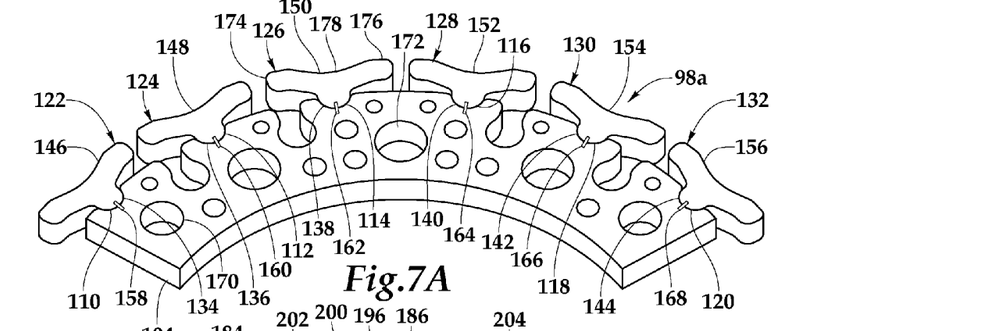
FIG. 7A is a perspective view of one embodiment of an outside skeletal member, which forms a portion of the run-flat support assembly.

FIG. 7A depicts one embodiment of an outside skeletal member, skeletal member 98*a*, which forms a portion of the run-flat support assembly 10. The body 104 includes mounting races 110, 112, 114, 116, 118, 120 which are circumferentially spaced therearound to define a series of flat, hard contact surfaces, which in one implementation may be ovalized. In one implementation, the skeletal member 98*a* further comprises a complimentary plurality of circumferentially spaced displaceable linkages 122, 124, 126, 128, 130, 132 that are respectively releasably rockably or swayably disposed within each mounting race 110, 112, 114, 116, 118, 120. Each of the linkages 122, 124, 126, 128, 130, 132 includes an arcuate face 134, 136, 138, 140, 142, 144 that is contoured and sized to be received in the mounting race in rollable or slidable pivoting contact. Additionally, elongated beams 146, 148, 150, 152, 154, 156 respectively integrally form a portion of each of the linkages 122, 124, 126, 128, 130, 132 such that the elongated beams 146-156 pivot relative to the respective mounting races 110-120.

A pair of contact bearing surfaces are also located at each end of each linkage and, in one implementation, the contact bearing surfaces may be separated by a concave portion. In another implementation, the contact bearing surfaces may be continuously formed. By way of example, with reference to the linkage 126, contact bearing surfaces 174, 176 are located at each end and separated by a contact bearing surface 178. As will be explained in further detail hereinbelow, the contact bearing surfaces 174, 176 alternatingly make contact with the inner wall of the tire during run-flat conditions as the linkage 126 pivots in order to actively increase the footprint of the tire and encourage return or rebound.

Each of the linkages 122-132 is displaceably secured to the respective mounting race 110-120 with a retainer member 158, 160, 162, 164, 166, 168 that plastically fails at a predetermined moment load, but withstands normal operating loads and those loads associated with an inflated condition. In one embodiment, the retainer member may be a mechanically weakened section or fuse that decouples by softening or releasing the linkage from the body 104 of the skeletal member 98*a* in response to a threshold being surpassed during a run-flat condition. In the absence of the threshold being surpassed the retainer member maintains the stiffness of the linkage member. As such, each of the linkages 122-132 is displaceably secured to a respective mounting race 110-120 of the body 104 and adapted to plastically fail at a predetermined moment load in a run-flat condition, thereby causing the linkages 122-132 to pivot relative to the respective mounting race 110-120.

As previously discussed, the skeletal structure 90 is embedded in the bodies 52 of the run-flat wheel assembly by being encased in a polymer housing, which provides structural encapsulation. With respect to integrity holes, apertures, such as apertures 170, 172, provide holes in the body 52*a* to permit the polymer that forms a portion of the polymer housing or body 52*a* to flow and set therethrough. This anchors the polymer within the body 52*a* and prevents sheering as well as increasing the adherence of the elastomeric polymer material against the rigid skeletal structure of the run-flat support assembly 10. It should be appreciated that in one embodiment the skeletal members 98*b*, 98*c*, 102*a*, 102*b*, 102*c* may have a substantially similar structure and function to that of skeletal member 98*a*.

Figure 7B:
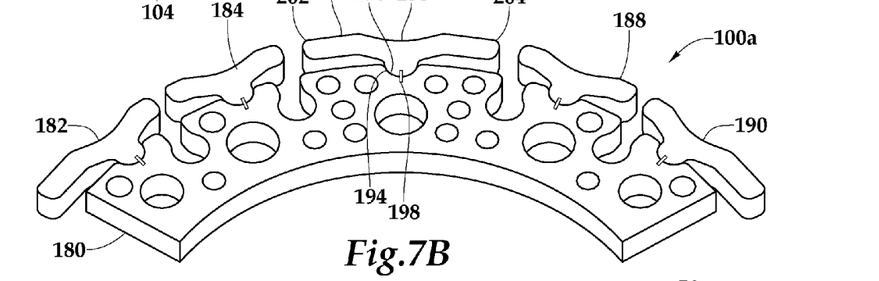
FIG. 7B is a perspective view one embodiment of an inside skeletal member, which forms a portion of the run-flat support assembly.

FIG. 7B depicts one embodiment of an inside skeletal member, i.e., skeletal member 100*a*, which forms a portion of the run-flat support assembly 10. With a structure having similarities to the skeletal member 98*a*, a body 180 has linkages 182, 184, 186, 188, 190 circumferentially spaced and releasably secured thereto. By way of example, with respect to the body 180 and the linkage 186, arcuate face 194 of the linkage 186 is pivotally positioned in mounting race 196 and held statically in place by a retainer member 198. The linkage 186 further includes an elongated beam 200 having contact surfaces 202, 204. Skeletal members 100*b*, 100*c* may have similar structure and function to the skeletal member 100*a*. Each of the skeletal rings may be offset with respect to the ends of the linkages 122-132 such that during the rotation of the tire, the leading and trailing edges of the linkages 122-132 are positioned adjacent to the void between adjacent linkages. Moreover, the elongated beams of the skeletal members 98*a-c*, 100*a-c*, 102*a-c* and of particularly laterally adjacent skeletal members 98*a-c*, 100*a-c*, 102*a-c* may vary in length to further minimize voids where no linkages are radially present. By way of example, both of these effects may be seen by referencing FIGS. 5, 6, 7A, and 7B.

Figure 8A:
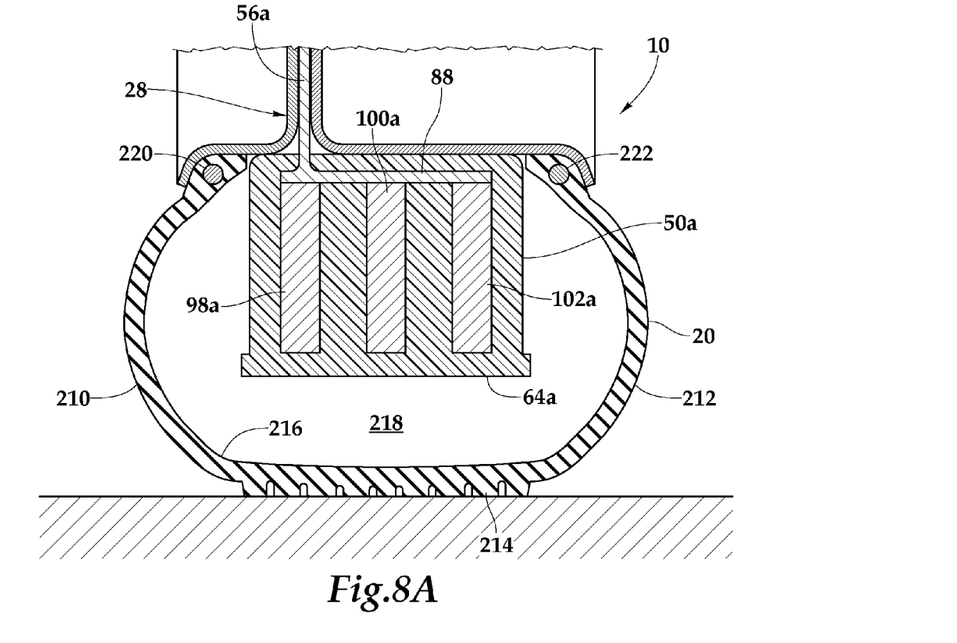
FIG. 8A is a cross-sectional view of the run-flat support assembly of FIG. 1 installed in a split wheel rim of a pneumatic tired wheel.

FIG. 8A depicts one embodiment of the run-flat support assembly 10 installed in the split wheel rim 28 of the pneumatic tired wheel 20 which includes side walls 210, 212, treads 214, and an inner wall 216 that defines a cavity 218. Additionally, beads 220 and 222 comprise loops of highstrength steel cables coated with rubber that provide the pneumatic tired wheel 20 the necessary strength to stay seated on the wheel rim 28. The support segment 50*a* is mounted to the wheel rim 28. The skeletal members 98*a*, 100*a*, 102*a* which are connected at the base 88 include the torque flange 56*a* which is removably coupled to the split wheel rim 28. As depicted, pneumatic tired wheel 20 is properly inflated and operational. In this condition, the support segment 50*a* rides unobtrusively in the cavity 218.

Figure 8B:
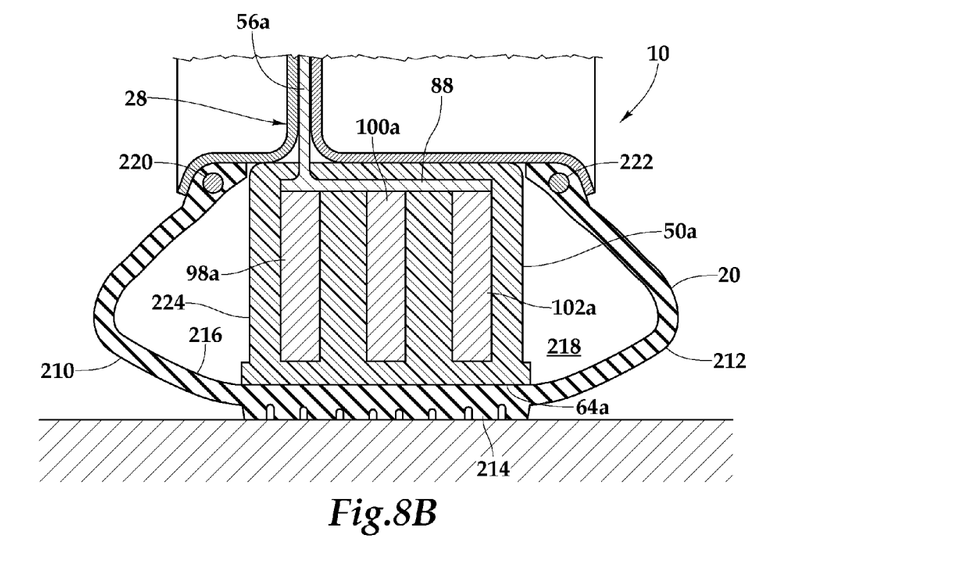
FIG. 8B is a cross-sectional view of the run-flat support assembly of FIG. 8A supporting the pneumatic tired wheel in a flat condition.

FIG. 8B depicts the run-flat support assembly 10 supporting the pneumatic tired wheel 20 which is in a flat condition. As illustrated, the crown 64*a* of the support segment 50*a* engages the inner wall 216 between the beads 220, 222 of the pneumatic tired wheel 20 in order to support the pneumatic tired wheel 20 and the load of the vehicle 12 in a flat condition. In particular, the crown 64*a* maintains an operation similar to that of inflated conditions since it is substantially centered with respect to the side walls 210, 212. The centering is maintained even during run-flat operation when relative motion occurs between the tire sidewalls 210, 212 and the interior components occurs.

Moreover, in a run-flat condition, the skeletal members 98*a*, 100*a*, 102*a* are actuated from being purely static elements to dynamic elements. Using principles of biomimetics and biomimicry, the skeletal members 98a, 100a, 102a respond to the run-flat conditions by becoming or transitioning into dynamic, active masses that selectively increase the footprint of the pneumatic tired wheel 28. It should be appreciated that the bead lock approach described herein is not required for the practice of the invention. Non-bead lock approaches which reduce the tread shoulder damage are also within the teachings of the present invention. Moreover, as shown, in one embodiment, the skeletal members of the skeletal structure meet a common base which is connected thereto, by a wield or integrally, for example. The torque flange then extends from this common base of the skeletal rings.

With respect to thermal barriers and conveyances, heat can be very difficult to expel from polymers such as polyurethane or other elastomers that may be utilized in the construction of the run-flat support assembly 10. In one implementation, heat barriers of polyurethane are positioned between the skeletal members to limit heat transfer in the lateral direction. The skeletal members, which may comprise a conductive material such as aluminum or steel, create thermal paths that compartmentalize the transfer of the heat along radial axes toward the wheel. Ambient air is in contact with the wheel to assist in the thermal mitigation.

Figure 9:
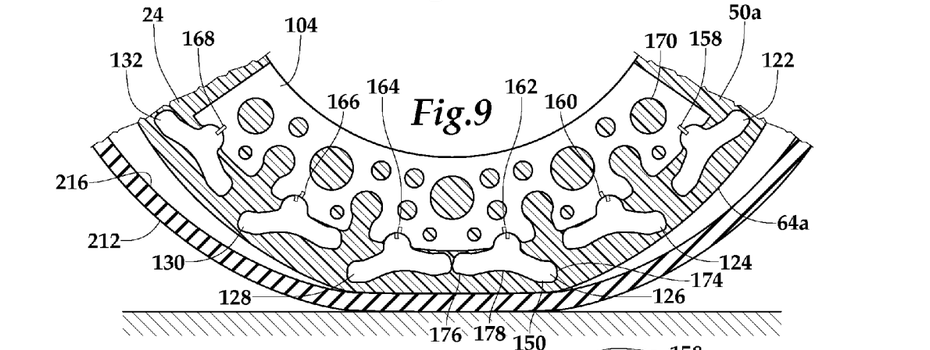
FIG. 9 is a cross-sectional view of the run-flat support assembly of FIG. 8A supporting the pneumatic tired wheel in a flat condition.

FIG. 9 is a cross-sectional view of the run-flat support assembly 10 of FIG. 8A supporting the pneumatic tired wheel 20 which is in a flat condition. As mentioned, the run-flat support assembly 10 is an active assembly which responds to load. As the pneumatic tired wheel 20 rotates in a run-flat condition, the retainer members 158-168 fail and the linkages 122-132 of the skeletal member 98a utilize biomimicry to deflect the interior wall 216 of the tire and thereby increase the footprint of the exterior wall of the tire, displace load, and minimize heat stress condition due to hysteresis.

The linkages 122-132 of the skeletal member 98a may act as levers, each having a fulcrum or pivot point near its center as represented by the arcuate faces 134-144 contacting the mounting races 110-120. Additionally, the retainer members 158-168 or fuses may fail in a series when exposed to the pre-determined load as a result of the run-flat condition. With reference to a particular linkage, the linkage 126, during rotation of the pneumatic tired wheel 20 in a run-flat condition, contacts the ground and deflects the interior wall 216 of the pneumatic tired wheel 20 to increase the footprint of the tire 212. More specifically, as the contact surface 176 is driven towards the body 104 by the road in the flat condition, retainer member 162 plastically fails, thereby permitting the linkage 126 to pivot the contact surface 176 of the elongated beam 150 towards the body 104 and the contact surface 174 towards the tire wall 212, thereby increasing the surface area of the tire wall 212 proximate to the contact surface 174. This increases the load over a larger area. That is, as depicted, force is applied by contact proximate to the ground at the contact bearing surface 176 of the linkage 126 which rotates about the arcuate face 138 into contact with the body 104. Reciprocally, the contact bearing surface rotates 174 at the mounting race 114 away from the body 104 about the arcuate face 138 into contact with the interior surface 216 of the tire, thereby increasing the footprint of the tire. As shown, this same trailing edge effect is also present with linkage 124.

It should be understood that the linkages 122-132 contacting the ground create a symmetrical leading edge effect as well. The linkage 128 contacting the ground deflects the interior surface of wall 216 of the pneumatic tired wheel 20 to increase the footprint of the tire and spread load. When force is applied by contact with the ground, the linkage 126 pivots with respect to the body 104 within the mounting race 116 to press against the interior wall 216 of the tire, thereby increasing the footprint of the tire. As shown, thus the leading edge effect is also present with linkage 130. That is, in response to a pre-determined moment load in a run-flat condition, the linkage 130 is pivotally actuated from being displaceably secured to the body 104. The linkage 130 then periodically deflects the interior wall of the pneumatic tire with the elongated beams of the linkage 130 as the wheel rim rotates.

Figure 10:
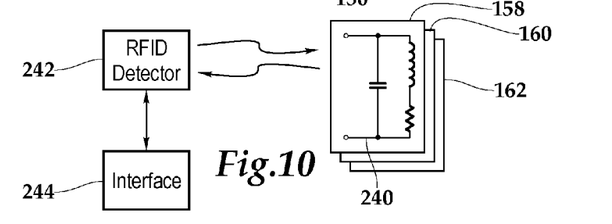
FIG. 10 is a schematic diagram of one embodiment of a system for monitoring the integrity of the run-flat support assembly.

FIG. 10 is a schematic diagram of one embodiment of a system for monitoring the integrity of the run-flat support assembly 10. RFID tags are associated with the retainer members; for example, RFID tag 240 is embedded within retainer member 158. In response to a retainer member plastically failing as discussed above, the frequency of the RFID tag is altered. An RFID detector 242 may aggregate data relative to the plurality of RFID tags to measure moment load for purposes of sensing or inspection, for example. By way of example, each RFID tag emits a frequency prior to failure. This data is aggregated by the RFID detector 242 and is representative of a fully intact run-flat support assembly 10. As the run-flat support assembly 10 is subjected to a load in a run-flat or flat condition, such as an under-inflated or deflated condition, retainer members may fail and alter frequency or not provide a frequency. The reduction on the number of detectable RFID tags indicating the approximate wear and integrity of the run-flat support assembly. The RFID detector may be associated with the vehicle or hand-held at a maintenance facility, for example, and an interface 244 may be provided for showing this data with a user.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A run-flat support assembly for a wheel rim of a pneumatic tired wheel, the assembly comprising:
    a tubular support structure positionable in a tire cavity of the pneumatic tired wheel, the tubular support structure coupleable to the wheel rim and adapted to turn concurrently with an axis of rotation of the wheel rim when coupled to the wheel rim, the tubular support including a plurality of arc-shaped tubular support segments;
    a skeletal structure disposed within the tubular support structure, the skeletal structure including a body adapted to turn concurrently with the axis of rotation when the tubular support is coupled to the wheel rim; and
    a plurality of circumferentially spaced linkages displaceably secured to respective mounting races of the body, each of the plurality of circumferentially spaced linkages adapted to plastically fail in response to a moment load in a run-flat condition, thereby pivoting relative to the respective mounting races, the linkages extending radially outwardly beyond an outer circumferential surface of the skeletal structure when the tubular support is coupled to the wheel rim.

2. The run-flat support assembly as recited in claim 1, wherein the tubular support structure comprises a polymer housing.

3. The run-flat support assembly as recited in claim 1, wherein each of the plurality of circumferentially spaced linkages are secured to the respective mounting races of the body by a retainer member that is adapted to plastically fail at the pre-determined moment load in the run-flat condition.

4. The run-flat support assembly as recited in claim 1, wherein each of the plurality of circumferentially spaced linkages further comprises an arcuate face, the arcuate face being contoured and sized to be received in the mounting race in pivoting contact in a run-flat condition.

5. The run-flat support assembly as recited in claim 1, wherein each of the plurality of circumferentially spaced linkages comprise an elongated beam having a pair of contact bearing surfaces at opposite ends thereof.

6. The run-flat support assembly as recited in claim 5, wherein the pair of contact bearing surfaces opposingly oscillate between contact pressure with the body and contact pressure with an interior wall of the pneumatic tired wheel in a run-flat condition.

7. A run-flat support assembly for a pneumatic tired wheel, the run-flat support assembly comprising:
a plurality of support segments positioned in a tire cavity of the pneumatic tired wheel, the plurality of support segments being abutted for end-to-end mating engagement to provide a tubular support structure having an interior circumference defined by respective radial surfaces of the plurality of support segments;
a plurality of skeletal structures disposed within the plurality of support segments, each of the plurality of skeletal structures including a body adapted to turn concurrently with the axis of rotation, the plurality of skeletal structures having respective torque flanges that extend through the radial surface of the plurality of support segments to provide a substantially circular body;
a plurality of circumferentially spaced linkages displaceably secured to respective mounting races of the bodies of the skeletal structures, each of the plurality of circumferentially spaced linkages adapted to plastically fail at a pre-determined moment load in a run-flat condition, thereby pivoting relative to the respective mounting races, the linkages extending radially outwardly beyond an outer circumference of the skeletal structure; and
a split wheel rim secured to the torque flanges.

8. The run-flat support assembly as recited in claim 7, wherein the substantially circular body formed by the respective torque flanges further comprises a plurality of mounting holes through the substantially circular body, the plurality of mounting holes being spaced to align with a plurality of wheel mounting holes associated with the split rim.

9. The run-flat support assembly as recited in claim 7, wherein the split wheel rim comprises two wheel half-sections.

10. The run-flat support assembly as recited in claim 7, wherein the plurality of support segments remain substantially centered with respect to interior walls of the pneumatic tired wheel during the run-flat condition.

11. The run-flat support assembly as recited in claim 7, wherein each of the plurality of support segments comprises a crown member for engaging an inner wall of the pneumatic tired wheel in the run-flat condition.

12. The run-flat support assembly as recited in claim 7, wherein the tubular support structure engages an interior of the pneumatic tired wheel between beads of the pneumatic tired wheel in the run-flat condition.

13. The run-flat support assembly as recited in claim 1, wherein the linkages are configured to increase the footprint of the wheel and distribute the load over an increased area in the run-flat condition.

14. The run-flat support assembly as recited in claim 7, wherein the linkages are configured to increase the footprint of the wheel and distribute the load over an increased area in the run-flat condition.

15. A run-flat support assembly for a pneumatic tired wheel, the assembly comprising:
a tubular support structure positionable in a tire cavity of the pneumatic tired wheel, the tubular support structure coupleable to the wheel so as to turn concurrently with the wheel, the tubular support including a plurality of arc-shaped support segments;
a skeletal structure including a plurality of arc-shaped segments each disposed in a respective tubular support segment and including
a radially outwardly facing surface having a first curvature, and
a radially inwardly facing surface having a second curvature smaller than the first curvature; and
a plurality of spaced linkages mounted to the arc-shaped skeletal segments to extend radially outwardly beyond the radially outwardly facing surfaces of the respective arc-shaped skeletal segments.

* * * * *

UNITED STATES PATENT AND TRADEMARK OFFICE
CERTIFICATE OF CORRECTION

| | |
|---|---|
| PATENT NO. | : 8,281,835 B2 |
| APPLICATION NO. | : 12/410319 |
| DATED | : October 9, 2012 |
| INVENTOR(S) | : William W. Gardetto |

It is certified that error appears in the above-identified patent and that said Letters Patent is hereby corrected as shown below:

In the Claims, at column 10, line number 33, the text --skeletal-- should be added between "arc-shaped" and "segments.".

Signed and Sealed this
Twelfth Day of March, 2013

Teresa Stanek Rea
*Acting Director of the United States Patent and Trademark Office*